UNITED STATES PATENT OFFICE.

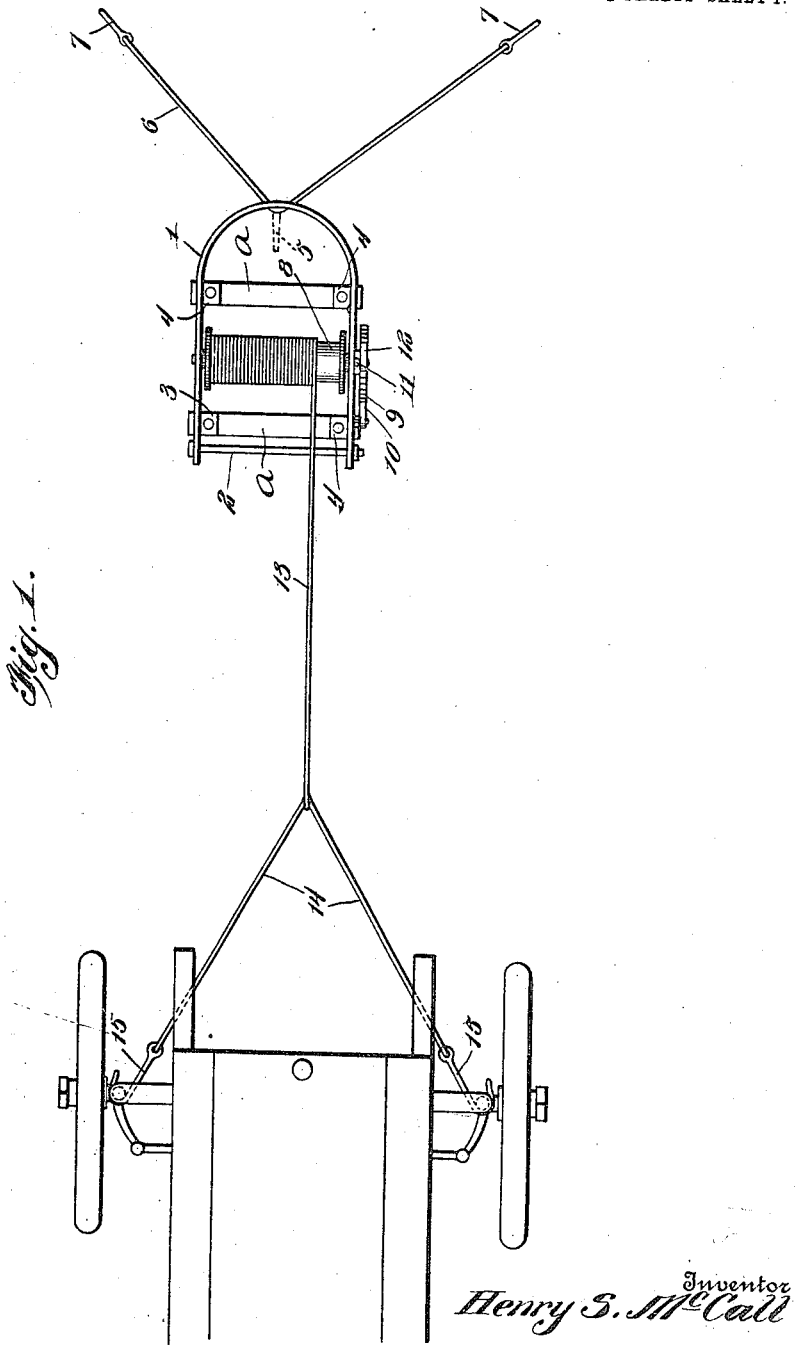

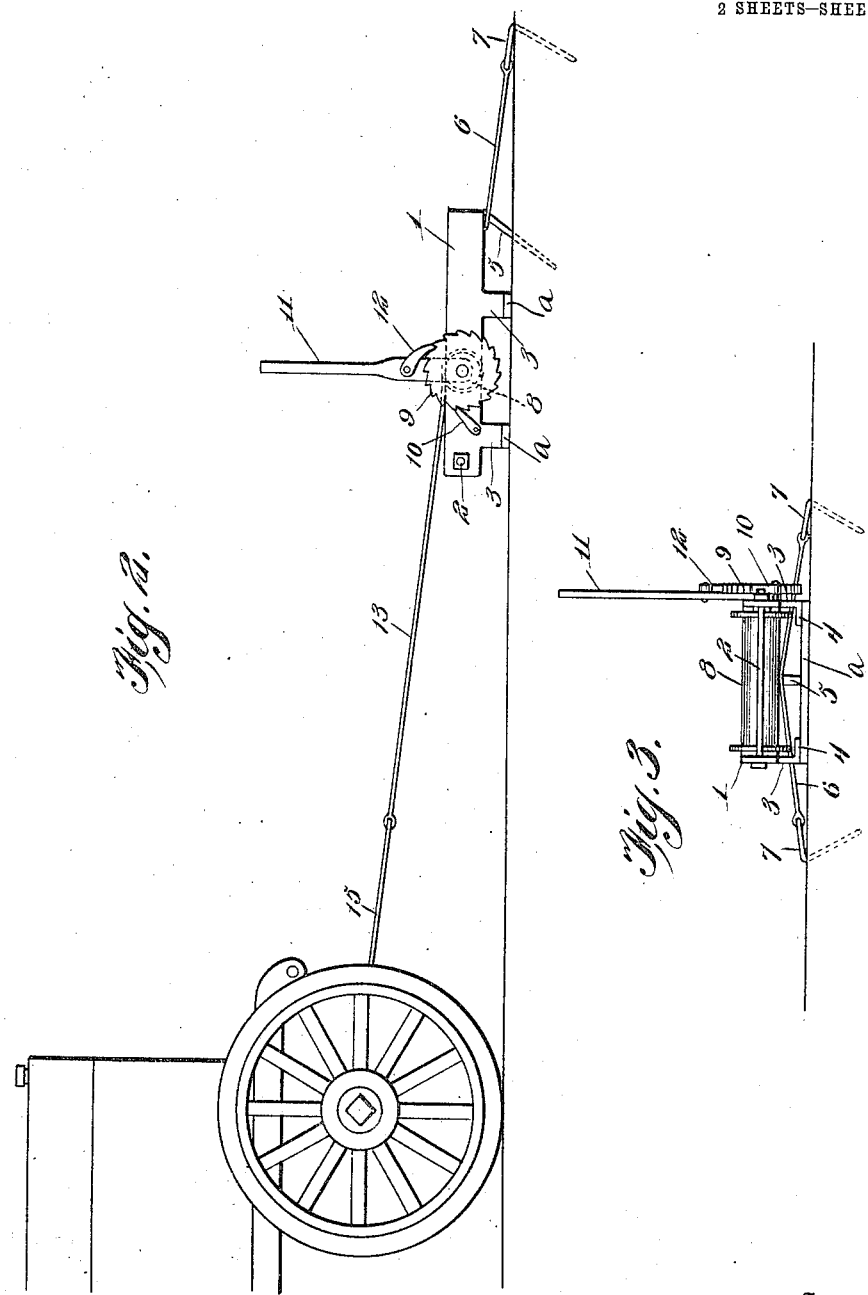

HENRY S. McCALL, OF OGEECHEE, GEORGIA.

AUTOMOBILE-EXTRICATOR.

1,034,635.   Specification of Letters Patent.   Patented Aug. 6, 1912.

Application filed February 20, 1912. Serial No. 678,821.

*To all whom it may concern:*

Be it known that I, HENRY S. McCALL, a citizen of the United States, residing at Ogeechee, in the county of Screven and State of Georgia, have invented new and useful Improvements in Automobile-Extricators, of which the following is a specification.

The invention is primarily designed for moving an automobile when the same becomes stalled on the road by reason of deep sand, soft spots or deep depressions, such as ruts, trenches or gullies.

While the invention is intended most especially for moving automobiles it will be understood from the following description and the drawings hereto attached that it may be adapted for moving vehicles or machines generally, since the device is adapted to be anchored and embodies a drum to which manual power is applied through the instrumentality of a lever and ratchet mechanism for winding a rope, cable or chain on the drum, said rope being connected with the automobile or other vehicle or machine to be moved.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view, showing the application of the invention. Fig. 2 is a side view. Fig. 3 is a rear view of the device.

Corresponding and like parts are referred to in the following description, and indicated in all the views of the drawings, by the same reference characters.

The machine embodies a frame 1 which may be of any substantial construction. As indicated the frame comprises a bar which is doubled upon itself into substantially U form, the rear ends of the side members being connected by means of a cross piece 2. Legs 3 are located near the front and the rear of the machine and are secured to the side bars of the frame. The lower ends of the legs 3 are extended horizontally to form feet 4, which prevent sinking of the device into sand, mud or other soft places in the roadway. Cross bars $a$ are attached at their ends to the feet 4 and serve to brace the side bars of the frame and to prevent the machine from sinking into the surface. The operator may stand on these cross bars when manipulating the lever 11, thereby steadying the machine and preventing its sluing. An extension 5 projects downwardly from the front end of the frame and inclines rearwardly and is adapted to enter the surface and to form anchoring means for the device when in service. A rope 6 or analogous flexible connection is adapted to engage the extension 5 and to have its ends made secure by anchoring means 7 which may consist of hooks or other means for holding the ends of the connection 6 to prevent slipping or rearward movement of the device when the same is subjected to a pulling strain.

A drum 8 is mounted in the side bars of the frame 1 and an end of its shaft or journal is provided with a toothed wheel 9. A pawl 10 pivotally connected to a side bar of the frame 1 is arranged to engage the teeth of the wheel 9 to prevent backward rotation of the drum and an unwinding of the rope, cable or chain wound thereon. A lever 11 is mounted upon the shaft or journal of the drum 8 and has a pawl 12 to engage the teeth of the wheel 9. When the upper end of the lever 11 is drawn forward the pawl 12 engages a tooth of the wheel 9 and turns the drum 8 to wind a connection 13 thereon. When the upper end of the lever 11 is moved rearwardly to cause the pawl 12 to obtain a new grip upon the toothed wheel 9 the drum 8 is prevented from turning backward by means of the pawl 10 engaging a tooth of the wheel 9 in the manner stated. The connection 13 may be a rope, cable or chain and is adapted to be connected with the automobile or other vehicle or machine to be moved. A short rope or chain 14 is provided at its ends with hooks 15 which are adapted to engage opposite end portions of the axle of the automobile or other vehicle to be moved. As the rope 13 is wound upon the drum 8 a pulling force of such power is applied to the automobile to draw the same forward out of the sand, rut, or other place stalling the same.

The device is comparatively small and occupies but very little room, hence may be conveniently carried in an automobile or vehicle as a part of the tool outfit. It is noted that the device is adapted to be operated by manual power and the force developed is of such power as to move the average automobile or vehicle. Should a machine become disabled the device provides convenient and effective means for moving the machine to one side of the road so as to be out of the way of traffic, hence the advantage of providing a device that may be operated by hand to develop a great amount of force to be expended in the manner herein stated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

An appliance for moving an automobile or analogous machine when stalled on the road, the same comprising a frame formed of a bar bent into U form, a cross piece connecting the ends of the bar, legs pendent from the side bars of the frame near the front and the rear thereof and provided with inner extensions at their lower ends forming supporting feet, cross bars attached to the inner extensions of the legs, an extension pendent from the front bar of the frame and rearwardly inclined and adapted to enter the surface of the road and form anchoring means, a flexible connection engaging the pendent extension at a middle point and provided at its extremities with anchoring means, a drum mounted upon the frame, a toothed wheel secured to an extension of the shaft or journal of the drum, a pawl pivotally connected with the frame and adapted to engage the toothed wheel to prevent backward rotation of the drum, an operating lever mounted upon the shaft or journal of the drum, a pawl carried by the operating lever and adapted to engage the toothed wheel to move the latter by stages, a flexible connection having an end portion wound upon the drum, and another flexible connection provided at its ends with attaching means to engage the axle of the automobile or like machine and having its middle part engaging the flexible connection arranged to wind upon the drum.

In testimony whereof I affix my signature in presence of two witnesses.

H. S. McCALL.

Witnesses:
ALBERT L. POTTER,
JACK C. REDDICK.

Copies of this patent may be obtained for five cents each, by addressing the "Commissioner of Patents, Washington, D. C."